INVENTORS
ROBERT C. DECHAINE
JOHN A. PAGE

ATTORNEY

United States Patent Office 3,558,324
Patented Jan. 26, 1971

3,558,324
METHOD FOR PREPARING A MULTICOLORED MEAT LIKE PRODUCT
John A. Page and Robert C. Dechaine, Minneapolis, Minn., assignors to General Mills, Inc., a corporation of Delaware
Filed Aug. 25, 1967, Ser. No. 663,373
Int. Cl. A23j 1/14
U.S. Cl. 99—17                                                    10 Claims

ABSTRACT OF THE DISCLOSURE

A process for producing a multicolored meat like product from a textured protein derived from vegetable protein. The protein is continuously colored with edible dyes in selective portions to simulate the various colors of multicolored meat products such as chicken.

BACKGROUND OF INVENTION

This invention relates to a process for producing a textured protein product which simulates the color variations of a multicolored meat product.

The food industry has had some success in the production of high quality, high protein products developed from vegetable protein such as soybeans, which to some degree simulate the nutritional flavor and appearance characteristics of meat. These high protein products are developed by utilizing the protein content of many vegetable sources such as peanuts, cereal grains, and soybeans. Depending upon the vegetable source used for the production of such products, the processor has developed protein products which have varying degrees of quality and acceptability for substitution for meat products in the human diet.

The varying degrees of success of simulating meat products have resulted from variations in the successful flavoring, coloring and production of texture to simulate familiar meat products. It has been found by the food industry that people tend to desire familiar flavors, textures and colors in the foods that they eat despite the fact that highly processed foods may, in their finished form, present nutritional and flavor benefits over the traditional foods. This preference by the consumer for the appearance and flavor of traditional foods has presented the Food Industry a particular problem in simulating both flavor and color similarities of meat. To some extent people associate flavor and palatability with the appearance of meat products and therefore insist on certain appearance associated with certain meat products for acceptability. For instance a consumer expects a piece of beef to have a red color in the raw state and a dark brown color in the completely cooked state. Likewise the consumer expects fish-type products to be white and chicken type products to have a variation in color characterized by the "white" and "dark" meat of the chicken.

Many of the problems of obtaining a uniform color, be it white or dark have been solved by the industry. However, in the case of a multicolored meat product such as might be expected from chicken, the difficulty of obtaining the proper marbling and color characteristics without producing a completely gray protein product has caused many problems. The problems arise when a processed textured protein product is colored by dye. Frequently the dye will simply become distributed throughout the product with the result that a gray and unsavory product is produced. On the other hand, not enough dye will leave the meat product too light colored with no simulation of the dark colored meat of the chicken.

It is therefore an object of the present invention to produce a protein product having the multicolor characteristics of a meat product.

It is a further object of the present invention to provide a new and improved method of producing a multicolored protein product simulating multicolored meat products.

It is another object of the present invention to provide a new and improved method of providing a textured protein product formed from vegetable proteins which have the multicolor characteristics of chicken.

SUMMARY

The process according to the present invention includes the step of intermixing a textured protein product with additives which add flavor and other characteristics to the product to simulate a meat product. The textured protein product can be fibrous or granular but it is normally, in the raw state, an off white color and with substantially no flavor. The additive and textured protein product are thoroughly mixed after which a dye which simulates the dark meat of a product such as chicken, is injected selectively into the mass of intermixed protein and additive. The selective injection of the dye is accomplished to simulate the islands of dark and white meat normally associated with a processed chicken product where the white meat and the dark meat of the chicken are processed together. Immediately after injection of the dye into the mixed protein and additive, the mixture is subjected to heat treatment to set a thermosetting binder which is a part of the additive. The heat sets the binder in the product to produce a protein product which has the firm chewy characteristics of meat. During the initial heat treatment of the protein and additive mixture, the mixture is subjected to mixing which produces islands of dyed protein and additive which simulate the portions of dark meat associated with the white meat of a chicken. The high temperatures eventually sets the binder and arrests the mixing action, this preventing degradation of the dyed portions of product.

DESCRIPTION OF THE PREFERRED EMBODIMENTS

Figure 1:
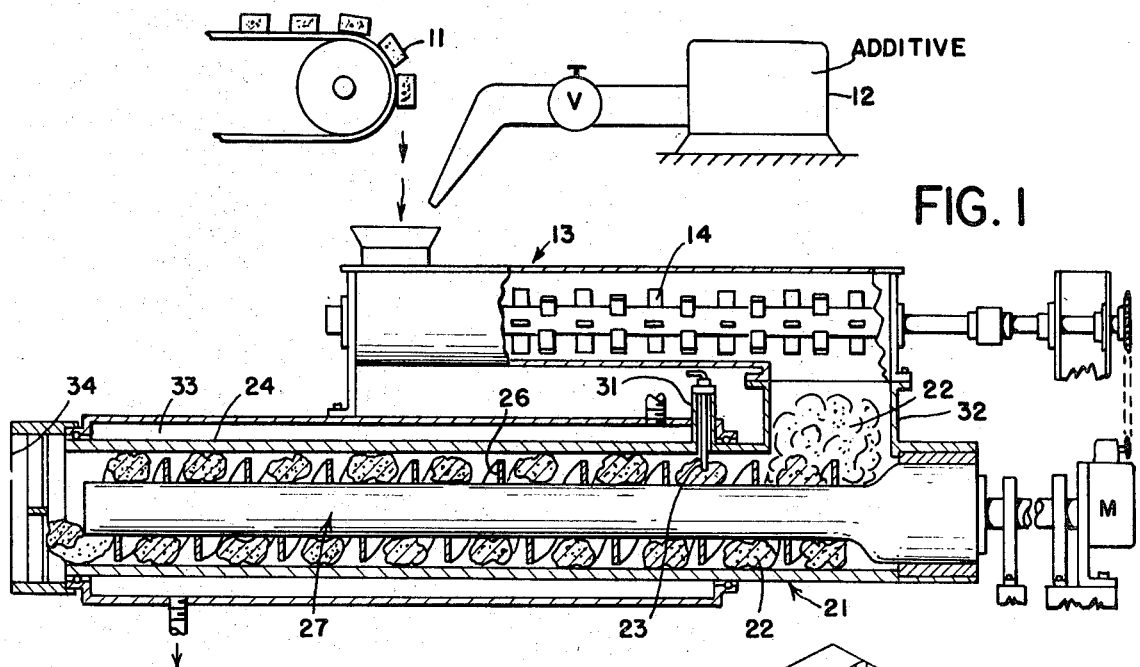
FIG. 1 is a block diagram using machine elements showing a process for producing a simulated meat product according to the present invention.

Textured protein product which forms the base for the simulated meat product is commercially available on the market. This commercially available textured protein product may be purchased in several forms. The first type is a fibrous product which is prepared from such vegetable protein sources as soybeans, peanut, safflower seeds, corn and the like. The protein is extracted from these raw materials and is coagulated in a bath where filaments of the protein are formed and combined into a tow of fiber which simulates the fiber characteristics of a meat product. Preferably, a soybean product which will be the example used to illustrate the principles of this invention, is the basic protein material because soybeans are high in protein compared to other vegetable products.

Another type of textured protein product is illustrated by a rather granular cheese like product. This high protein product is an off white color but does not have the fibrous characteristics of the previously described product. This product is also available on the market and may be obtained with a substantially neutral flavor and is useful in producing simulated meat products according to the present invention. This latter product is derived from exactly the same vegetable protein sources and is formed into a mass of high protein product having a substantially white color and a neutral flavor without the production of the fiber characteristics. The granular characteristics of this product, however, lend it a textured characteristic and therefore tends to simulate a meat product.

The first step in the process concerns the impregnation of the textured protein with an additive. This additive may contain any number of components such as flavoring materials, binders, coloring agents, fat and similar materials which can be used to substantially duplicate the flavor and many appearance characteristics of meat. Impregnation of the protein fiber with the additive material can be carried out in several ways. First the additive may simply be combined with the textured protein product and permitted to sit for a long time during which the additive impregnates the product and thereby becomes uniformly distributed throughout the textured protein. As might be expected this is a rather slow process and accordingly, a more rapid process of agitating the product may preferably be used. In such a system the textured protein 11 (see FIG. 1 of the drawings), is combined with the additive from a tank 12 and placed in a mixer 13 which has paddles 14 for agitating the combined protein product and additive to thoroughly intermix the two ingredients. During such agitation the protein product and additive may receive intense mixing, compressive and/or shearing forces.

This agitation insures a uniform distribution of all the constituents of the additive throughout the textured protein and especially insures the thorough distribution of the binder in the textured protein. Binder is an ingredient included in the additive which is used to bind or secure the formless mass of protein material. In the case where fibrous protein product is used, the binder is set, for example, by heat so that it bonds the various filaments and thereby simulates the connective tissue of a meat product. The binder may be any number of edible binders used for such purposes and might include such edible binders as various albumins, such as egg albumen, fish albumin, and the like. Other binders which may be used, depending upon the end use of the product, are such binders as gelatin, certain processed starches, the various pectins, casein, and gums, such as carboxymethyl cellulose, guar, and others. Undoubtedly, other binders may be found useful in various applications and the above list is merely set forth by way of example. The former binders are heat irreversible and may be used in a meat product which will be ultimately heated by the homemaker for the production of hot foods. Heat reversible binders might be used where the ultimate application of the meat like product is for a dish simulating a cold food product.

A particularly useful and preferred binder used to illustrate this invention is egg albumen. Egg albumen provides several desirable characteristics for production of the simulated meat product. First, it can be set to bind the fibers or the protein granules by merely applying heat to the mixed textured protein and additive. Further, egg albumen is heat irreversible and therefore it may be used in meat dishes which will ultimately be heated prior to serving as a finished food product. Finally, egg albumen is readily available in commercial quantities at reasonable prices and therefore provides an economical and adequate supply of binder for a simulated meat product.

After the textured protein has been thoroughly impregnated by the additive, the mixture is selectively injected with an edible dye which is of the proper color to simulate the dark meat of chicken for example. The edible dye should be introduced or injected into the mixture in order to achieve a random distribution of the coloring.

Figure 2:
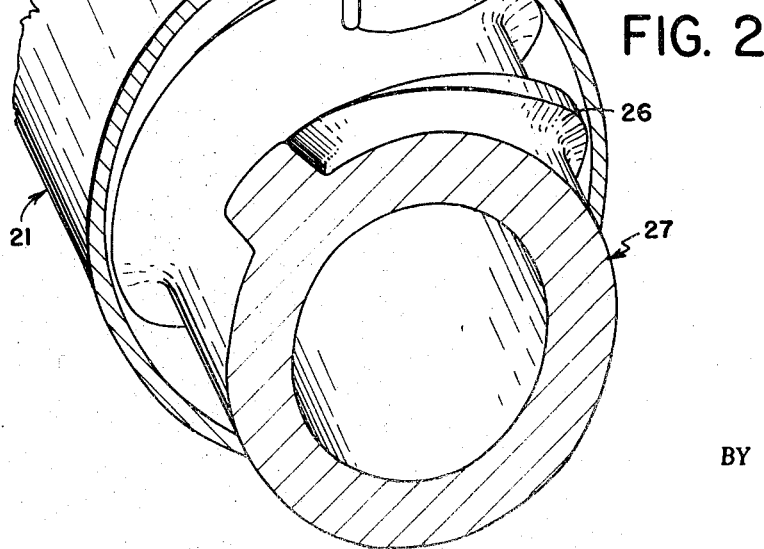
FIG. 2 is a fractional, isometric view of an extruder and barrel illustrating dye injection according to the present invention.

An especially effective method of achieving this random injection and distribution of the dye in the mass of mixed textured protein product and additive is to inject the dye into the mixture as the mixture is being worked in an extruder mixer generally designated by the number 21 as illustrated in FIGS. 1 and 2 of the drawings. As the mixture is worked, it may receive compressive and shearing forces from the mixer. The dye may be introduced into the mixture 22 through a tube 23 which is mounted in the barrel 24 of the extruder mixer 21. The tube 23 extends down to or between the flights 26 of the extruder 27 so that the mass of protein and additive 22 passes by the end 28 of the tube 23. A continuous flow of dye is introduced into the tube 23 through a conduit 29. This flow of dye can be easily regulated in relation to the quantity of the mixture passing the tube 28. Almost any desired quantity of the mixture may be dyed by this method, however, it has been found that simulation of a chicken product can be achieved by coloring or dying approximately 25% of the mixture passing through the mixer 21.

It is noted that the injector, generally designated by the number 31, is mounted at or near the input 32 of the mixer 21. This is desirable since the dye must be introduced into the mixture 22 before the mixture is subjected to heat which sets the egg albumen binder and inhibits any dispersion of the dye in the product.

Preferably, the additive used to impregnate the textured protein product is an aqueous solution. "Aqueous solution" is used broadly here to include a mixture wherein a number of ingredients such as animal fats like chicken, if a chicken product is to be simulated, flavor enhancers such as hydrolyzed protein, spices, onion salt, dried egg white, wheat gluten, garlic, white pepper, onion, pepper, and similar products, various binders previously mentioned, and similar ingredients are mixed in a water base in which the individual ingredients go into solution with the water to greater or lesser degrees depending upon the individual characteristics thereof. Many of the ingredients such as the fat will not be dissolved by the water, but the expression "aqueous solution" is being used in a broad sense here to include those ingredients for lack of a broad term which would cover a mixture of such a broad range of ingredients.

Since the aqueous solution is thoroughly distributed throughout the mass of the textured protein product by the foregoing impregnation or mixing thereof, the edible dye chosen for this preferred method would be a water soluble dye. When a water soluble dye is used, the mixture of the textured protein demonstrates substantially the same absorbing characteristics as a wet blotter demonstrates as ink is placed on the blotter. In other words, the water soluble dye quickly disperses through the wet mixture of textured protein and additive so that the injection, while it takes place on a continuous basis, does not produce merely a planer injection of dye as the mixture passes by the injection tube 23. The mixture acts as a wet blotter and the water soluble dye immediately disperses in three dimensions in the area adjacent the outlet 28 of the injection tube 23. Thus there is three dimensional application of the dye to the mass of material in the mixer 21. The exact mechanism of the dispersion of the water soluble dye in the mixture is not completely understood, however, it is believed that the combination of the water and the binder cooperate with the water soluble dye to enhance the blotter dispersion characteristics of the dye. It has been found through experiments that application of the dye to the raw protein fibers does not result in the dispersion of the dye in the product. When raw protein fiber or the like is used, a planer distribution of the dye is achieved which is undesirable. There seems to be no dispersion of the dye in the product. However, it has been found that when the water and egg albumen, in the preferred embodiment, is added, the dye is satisfactorily distributed in a portion of the mass.

Immediately after injection of the dye into the mixture 22, heat is applied to the mixture at sufficiently elevated temperatures to set the binder which is at this point, thoroughly distributed throughout the mixture. Thus, the mixture takes on the firm characteristics of a meat product as the binder is thermally set. As the product becomes set by the binder, further dispersion of the dye is arrested so that simply a gray product does not result. In a mixer such as mixer 21, the heat can be applied to the mass of material 22 by introducing steam or hot water into jacket 33 for application to the barrel 24 of the mixer. This heat is directed to the mass of material and has been found to be an effective method of applying heat to a product being worked in a mixer. Temperatures in the range from 140° F. to about 190° F. are found to be satisfactory for setting most thermosetting binders. A temperature range of 140° F. to about 160° F. is satisfactory for setting egg albumen.

Figure 3:
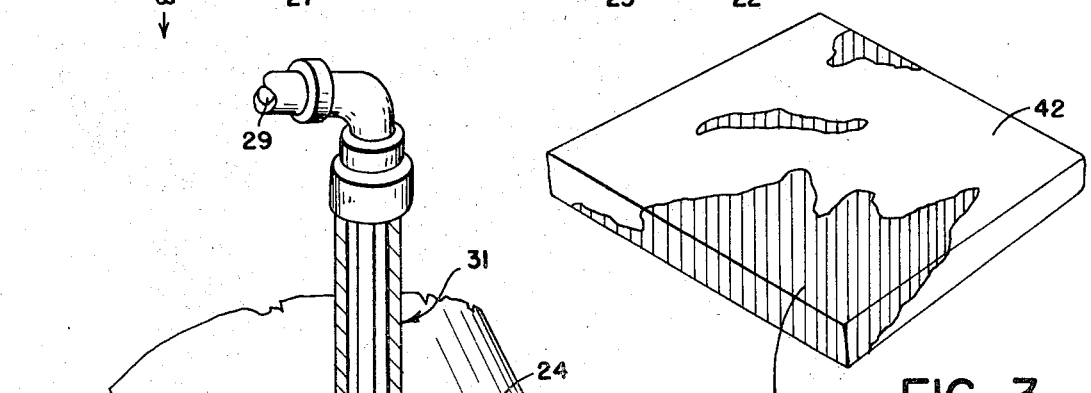
FIG. 3 is an isometric view of a finished product having varying colored areas.

After the product is set, the auger continues to work the product and thereby breaks the dyed areas into islands of dark protein product which are incorporated in the surrounding white simulated meat product. The product is then conveyed to an outlet 34 where it is extruded from the mixer. At the outlet end of the mixer, a knife or grinder may be mounted on the mixer so that the product is ground, sliced, diced, or similarly processed. In the case where a dicing mechanism is attached to the mixer, the product is diced into cubes of marketable size. See FIG. 3 of the drawings. Such dices of material take on the appearance of diced chicken. Some of the dices are completely dark in color thereby representing the dark meat of the chicken. Other dices are completely white representing the white meat of the chicken. Still other dices such as that shown in FIG. 3 have a combination of dark material 41 and white material 42 which simulates the dark and white meat combination of chicken when the meat is similarly diced and prepared for sale.

Thus, several processing steps have been eliminated. Formerly, a batch of white protein product was combined with a batch of dark protein product which was then mixed and extruded in a completely separate operation to achieve the same result which is achieved in the flavoring and coloring of product according to the present invention. A more thorough understanding of the invention will be achieved by reference to the following example according to the present invention.

EXAMPLE

A fibrous protein product derived from soy protein was combined with an additive containing the following ingredients:

| | Parts |
|---|---|
| Water | 50.0 |
| Fat/oil | 2.00 |
| Filler cereal (flour, grits etc.) | 10.0 |
| Egg albumen | 10.0 |
| Cellulose | 4.0 |
| Sugar | 2.5 |
| Flavor | 3.5 |
| | 100.0 |

The ratio of additive to fibrous protein was about 55% additive by weight and 45% fiber by weight. This mixture of product was agitated in a paddle type mixture to thoroughly impregnate the fibrous protein with the additive. Next a water soluble dye was metered into the mixture of protein and additive at the rate of 80 grams per minute of dye solution for every 90 pounds per minute of the mixture which was conveyed through an auger mixer. The dye had a composition as follows:

| | Parts |
|---|---|
| $H_2O$ | 96.00 |
| Caramel #800 color | 2.68 |
| Cocoa | 1.32 |

Next, the randomly dyed product was heated to a temperature of 170 to 180° F. to set the egg albumen binder which formed a part of the additive. The product was set by the heat and the cooking process completed producing islands of dyed protein product surrounded by white protein product. About 25% of the entire mass was dyed to simulate dark meat. The mixture was then discharged from the auger, and diced to form chunks of protein product which simulated the blend of white and dark meat characteristic of natural chicken.

It is to be understood that the above is merely an illustration of the principles of the invention. Many variations thereof may be practiced by those skilled in the art which fall within the spirit and scope of the invention. For example, rather than using a water soluble dye, a fat soluble dye might also be selected. In this case, the fat which is added to the protein product to produce the flavor characteristics normally associated with meat will act in the same way as the water to dissolve the fat soluble dye and produce the dispersion of the dye necessary to achieve the desired dying of the product. Likewise, a number of different binders might be utilized for the product depending on the ultimate use for the product.

Now, therefore, we claim:

1. A process for preparing an edible protein product having an appearance simulating that of a multi-colored meat product which comprises intermixing a textured protein product with an additive including a thermosetting binder in an amount sufficient to bind the various filaments of the protein thereby providing a protein mass, selectively injecting edible dye into portions of said mass such that it simulates the desired products and then immediately heating the dye containing mass at a temperature and for a period of time sufficient to set the binder to form a protein product having the appearance of a multi-colored meat product.

2. A process in accordance with claim 1 in which said textured protein is a non fibrous, granular protein product.

3. A process in accordance with claim 1 in which the additive is an aqueous medium and in which the dye is a water soluble dye.

4. A process in accordance with claim 1 in which said binder is egg albumen.

5. A process in accordance with claim 1 in which sufficient dye is injected into said protein and additive mixture to color up to 25% of the mixture.

6. A process in accordance with claim 5 in which said textured protein is a fibrous protein product.

7. A process in accordance with claim 5 in which the meat product which is simulated is chicken.

8. A process for preparing an edible protein product having an appearance simulating that of a multi-colored meat product which comprises impregnating a textured protein product with an additive including a thermosetting binder in an amount sufficient to bind the various filaments of the protein, thereby providing a protein mass, selectively injecting edible dye into portions of said mass, and then immediately heating the dye-containing mass at a temperature and for a period of time sufficient to set the binder and simultaneously subjecting the heat set protein product to working forces thereby breaking said dyed portions into islands and producing a protein product having the appearance of a multi-colored meat product.

9. A process for preparing an edible protein product having an appearance simulating that of a multi-colored meat product which comprises impregnating a textured protein product with an additive including an egg albumen binder, subjecting the mass of textured protein product and additive to intense mixing and shearing forces, injecting edible dye into portions of said mass, subjecting said dye containing mass to heat at temperatures of about 140° F. to about 190° F. for a period of time sufficient to set the egg albumen binder and simultaneously subjecting the heat set protein product to compressive and shearing forces thereby breaking said dyed portions into islands and producing a protein product having the appearance of a multi-colored meat product.

10. A process for preparing an edible protein product having an appearance simulating that of the multi-colored meat product which comprises intensely mixing textured protein product with an additive including a thermosetting binder, said mixing characterized by intensive shearing compressive and mixing forces to produce a product mixture, forcing said mixture past an injector, continuously injecting edible dye into portions of said mixture and then subjecting said partially dyed mixture to heat sufficient to set the binder and simultaneously applying intensive mixing forces to the product thereby breaking said partially dyed portions into islands and producing a protein product having the appearance of a multi-colored meat product.

References Cited

UNITED STATES PATENTS

| | | | |
|---|---|---|---|
| 3,197,310 | 7/1965 | Kjelson | 99—17 |
| 3,210,195 | 10/1965 | Kjelson et al. | 99—14 |

RAYMOND N. JONES, Primary Examiner

W. A. SIMONS, Assistant Examiner

U.S. Cl. X.R.

99—148